(12) United States Patent
Kono et al.

(10) Patent No.: US 7,220,060 B2
(45) Date of Patent: May 22, 2007

(54) ROLLER BEARING

(75) Inventors: Shingo Kono, Iwata (JP); Kousuke Obayashi, Iwata (JP); Hideki Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 128 days.

(21) Appl. No.: 11/072,436

(22) Filed: Mar. 7, 2005

(65) Prior Publication Data

US 2005/0196089 A1 Sep. 8, 2005

(30) Foreign Application Priority Data

Mar. 8, 2004 (JP) ............... 2004-064480

(51) Int. Cl.
*F16C 33/46* (2006.01)
(52) U.S. Cl. .................... 384/577; 384/572; 384/576
(58) Field of Classification Search ............... 384/572, 384/575–580
See application file for complete search history.

(56) References Cited

U.S. PATENT DOCUMENTS

| 1,426,578 | A | * | 8/1922 | Lott ...................... 384/577 |
| 5,039,231 | A | * | 8/1991 | Kispert et al. ........... 384/572 |
| 6,102,579 | A | * | 8/2000 | Kupietz ................... 384/572 |
| 6,857,785 | B2 | * | 2/2005 | Takahashi et al. ........ 384/572 |
| 2003/0077017 | A1 | * | 4/2003 | Fugel et al. .............. 384/578 |
| 2005/0185875 | A1 | * | 8/2005 | Kono et al. .............. 384/577 |
| 2006/0104560 | A1 | * | 5/2006 | Kono et al. .............. 384/572 |

FOREIGN PATENT DOCUMENTS

JP    2005-54871    3/2005

OTHER PUBLICATIONS

Furukawa Taichiro et al., Patent Abstracts of Japan, "Shell-Shaped Roller Bearing and Manufacture Thereof", Publication No. 06-307456 and Publication Date: Nov. 1, 1994.
Oba Fumio et al., Patent Abstracts of Japan, "Roller Bearing", Publication No. 07-238940, Publication Date: Sep. 12, 1995.

* cited by examiner

*Primary Examiner*—Thomas R. Hannon

(57) ABSTRACT

To provide a roller bearing assembly, which can be assembled with a minimized number of assembling steps and without any drop-off preventing sleeve being employed and which can provide a large load bearing capacity, the roller bearing assembly includes an inner race 1 having a raceway surface 1a defined therein, a plurality of rollers 2, and a ring-shaped roller retainer 3 having a plurality of pockets 4 defined therein in a direction circumferentially thereof for accommodating therein the respective rollers 2 in a circular row. The roller retainer 3 also has pillars 5 each defined between the neighboring pockets 4. The roller retainer 3 is positioned on the inner race 1 with each of the pillars 5 thereof intervening between the neighboring rollers 2 to thereby retain the rollers 2 in position within the respective pockets 4 from a direction radially outwardly of the row of the rollers 2. The diameter of the circle depicted by and in touch with the pillars 5 is chosen to be greater than the diameter of the pitch circle PCD depicted in the circular row of the rollers 2.

13 Claims, 9 Drawing Sheets

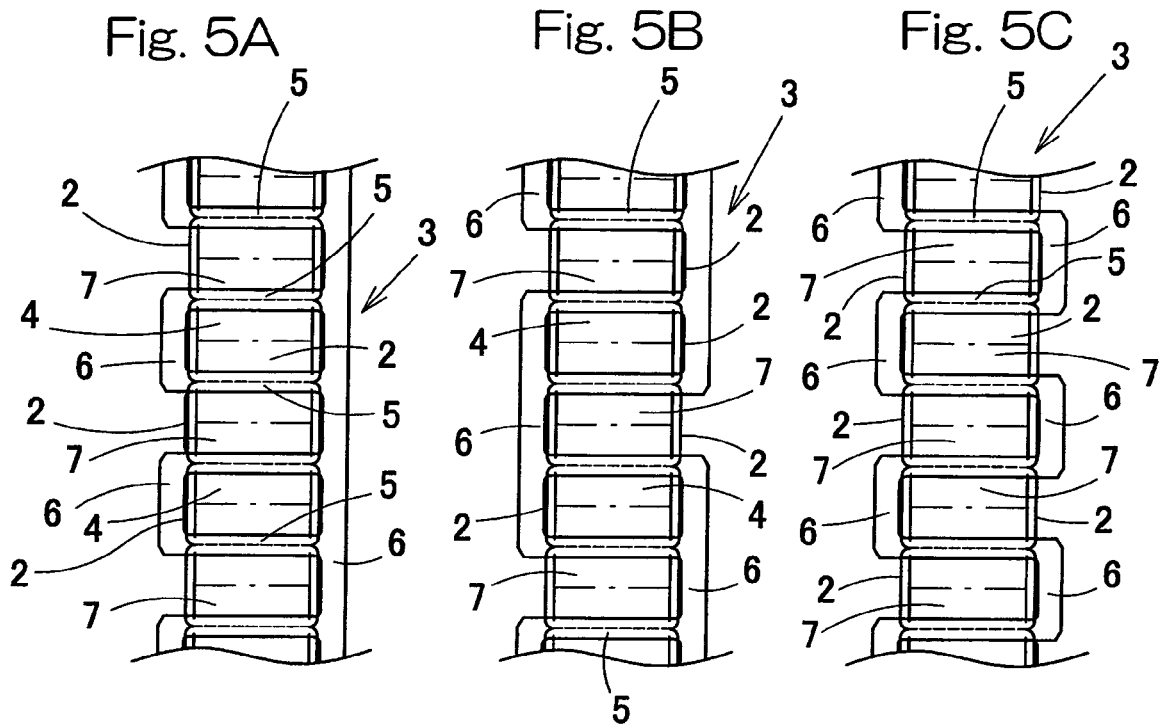
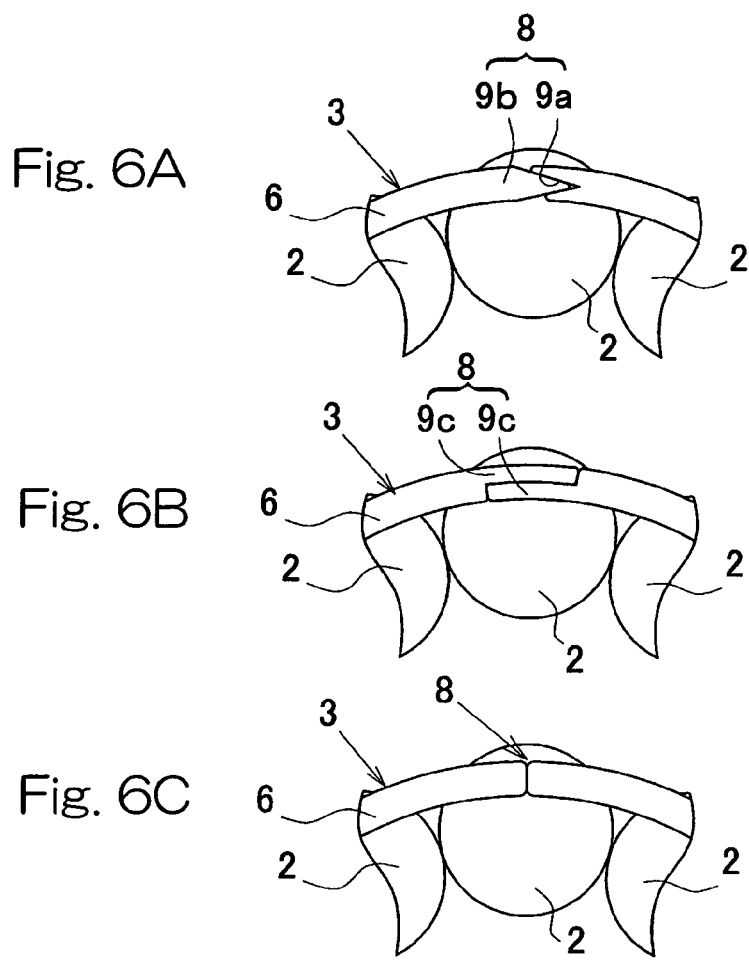

ROLLER BEARING

BACKGROUND OF THE INVENTION

1. Field of the Invention

The present invention generally relates to a roller bearing and, more particularly, to a roller bearing such as, for example, a roller bearing having an inner race and needle roller bearing having a roller retainer, of a kind used in the field of application similar to that of the full complement roller bearing, for example, in a seat reclining mechanism, motorcycle rear suspension link, roller rocker arm and planetary reduction gear unit.

2. Description of the Prior Art

The full complement roller bearing is generally used in the field of application in which the roller bearing is required to have a large load bearing capacity for a limited outer diameter of the roller bearing. Since the full complement roller bearing makes no use of any roller retainer having retainer pillar intervening between the neighboring rollers, both of the number of the rollers used and the load bearing capacity can be increased as compared with those of the retainer type roller bearing.

As is well recognized by those skilled in the art, the full complement roller bearing makes no use of any retainer and, therefore, some or all of the rollers tend to drop off before mounting of the roller bearing onto a machine component and, at the same time, the number of assembling steps tend to increase. Also, as shown in FIG. 11 showing a fragmentary longitudinal sectional representation of the full complement roller bearing, even where the rollers 30 used in such full complement roller bearing are assembled using outer and inner sleeves 31 and 32, the outer and inner sleeves 31 and 32 are required to be removed during the assemblage. Accordingly, with the full complement roller bearing of the type shown in FIG. 11, not only is the number of assembling steps increased, but also increase of the cost and the environment-related problem tend to occur because of the use of the sleeves 31 and 32.

In view of the foregoing, various suggestions have hitherto been made to avoid the drop-off of the rollers. One of those suggestions includes the use of the rollers each having its opposite ends formed with coaxially extending steeples so that the press-worked outer race, i.e., the outer race formed by means of a press work, having collars formed at its opposite ends can saddle each roller with the collars receiving the steeples of the respective roller. See, for example, the Japanese Laid-open Patent Publication No. 6-307456.

Another one of those suggestions includes filling a thermally curable grease to render the rollers of the full complement roller bearing to be non-detachable such as disclosed in, for example, the Japanese Laid-open patent Publication No. 7-238940.

The full complement roller bearing of the structure, in which the steeples are employed at the opposite end faces of each roller to achieve the non-detachability of the rollers, i.e., to render the rollers to be non-detachable, has the following problems:

The effective length of each roller tends to be reduced a quantity corresponding to the sum of axial lengths of the opposite steeples formed therein.

Since the opposite ends of each roller are axially outwardly steepled, the frictional wear of the roller end faces tends to be prominent when the full complement roller bearing of the specific structure is employed in the environment where an induced thrust force is large.

Since the opposite ends of each roller must be processed in any way to have the steeples, the respective roller is costly as compared with the roller having opposite flat end faces.

On the other hand, the full complement roller bearing of the structure, in which the thermally curable grease is filled to constrain the rollers in a non-detachable fashion, has the following problems:

The use of the thermally curable grease limits the temperature under which the full type roller bearing of the specific structure can be used and operated.

Means for lubricating the bearing that can be employed, for example, the type of the grease used and the type of oil used, are limited.

In view of the foregoing, it has been suggested in, for example, the Japanese Patent Application No. 2003-285566 that in the retainer type roller bearing a generally ring-shaped roller retainer having a plurality of pockets spacedly defined therein in a direction circumferentially thereof is made of a synthetic resin capable of deforming in a direction radially thereof and, on the other hand, the retainer pillar present between the neighboring pockets retains the respective roller from an inner diametric direction and has an outer diameter smaller than the diameter of the pitch circle in which the rollers are arranged.

According to the suggested design, the rollers can be placed inside the respective pockets of the roller retainer when after the rollers have been mounted around an inner periphery of the outer race, the roller retainer is inserted radially inwardly of the circular row of the rollers while a portion of the roller retainer is radially deformed against its own elasticity by the application of an external force and subsequently releasing the external force to allow the roller retainer to restore to the original position with the rollers consequently positioned inside the respective pockets.

However, the structure of the retainer type roller bearing discussed above is applicable only to a specific roller bearing, i.e., the roller bearing having an outer race and cannot be applied to such a retainer type roller bearing having an inner race 33 and a roller retainer 34 as shown in FIG. 12. In addition, when the roller bearing of a type having a raceway (either an outer race or an inner race) is compared with the raceway-less full complement roller bearing, i.e., the full complement roller bearing having no raceway, of the same sectional height, a problem has been found in that the roller bearing of the type having the raceway tends to have a reduced load bearing capacity.

SUMMARY OF THE INVENTION

Accordingly, the present invention has devised to substantially eliminate the various problems and inconveniences inherent in the prior art roller bearings and is intended to provide an improved roller bearing assembly of a type utilizing the inner race, which can be assembled with a minimized number of assembling steps and without any drop-off preventing sleeve being employed and which can provide a large load bearing capacity.

In order to accomplish the foregoing object of the present invention, the roller bearing assembly herein provided in accordance with one aspect of the present invention includes an inner race having a raceway surface defined therein, a plurality of rollers, and a ring-shaped roller retainer having a plurality of pockets defined therein in a direction circumferentially thereof for accommodating therein the respective rollers in a circular row while allowing the rollers to be seated on the raceway surface of the inner race. The roller retainer also has pillars each defined between the neighboring pockets. The roller retainer is positioned on the inner race with each of the pillars thereof intervening between the neighboring rollers to thereby retain the rollers in position within the respective pockets from a direction radially outwardly of the row of the rollers. The diameter of the circle depicted by and in touch with radially inward ends of the pillars is chosen to be greater than the diameter of the pitch circle depicted in the circular row of the rollers.

According to the present invention, the pillars of the roller retainer retains the rollers in position within the pockets from a direction radially outwardly of the row of the rollers and the inner diameter of the circle depicted by and in touch with the inner diametric portions of the pillars is chosen to be greater than the pitch circle diameter. Accordingly, it is possible to allow the pillars not to exist on the pitch circle represented by the pitch circle diameter and, therefore, the space between the neighboring rollers, which would increase if the pillars are positioned on the pitch circle, does not increase and the resultant roller bearing assembly, although assembled as a non-detachable type with the use of the roller retainer, can have the rollers in a number about equal to the number of the rollers employed in the full complement roller bearing. Hence, as compared with the conventional bearing assembly of a type having the inner race and having the same sectional height, a relatively large load bearing capacity can be exhibited. Because of this, the various problems hitherto encountered with the full complement roller bearing can advantageously be eliminated such as the capability of assembling with a minimized number of assembling steps with no need to use any drop-off preventive sleeve.

Preferably, each of the pillars may have an outer diametric portion and an inner diametric portion positioned radially inwardly of the outer diametric portion, which inner diametric portion being tapered radially inwardly in its cross-sectional shape. For example, cross-sectional shape of the pillar may be a nearly triangular shape.

The space between the neighboring rollers represents a generally triangular shape gradually flaring in a direction radially outwardly. Accordingly, in order to increase the sectional area of each of the pillars without such space being increased, it is preferred that each of the pillars may have a sectional shape gradually tapering in a direction radially inwardly. However, when while the outermost diametric portion of each retainer pillar, which has a maximum width as measured in a direction conforming to the circumference of the roller retainer, is fixed at a substantially constant value, the space between the surface of each roller and the surface of each retainer pillar is increased, an undesirable blockage of flow of the lubricant can be avoided to thereby avoid reduction in lubricity.

Also preferably, the roller retainer may be made of a synthetic resin. If the roller retainer is made of the synthetic resin, the roller retainer can exhibit an elasticity to a certain extend and, therefore, during the assemblage of the bearing assembly the roller retainer can be deformed, thereby facilitating incorporation of the roller retainer or the rollers.

In a preferred embodiment of the present invention, each of the rollers has a diameter equal to or smaller than 6 mm and the number of the rollers is equal to or smaller by two or less than that of the rollers used in a full component bearing assembly.

If the bearing assembly makes use of rollers of a relatively great diameter, it can easily be designed that the number of the rollers used therein may be equal to or smaller by two or less than the number of the rollers used in the full component bearing even though the standard roller retainer is employed in such bearing assembly. However, in the case where each roller has a diameter equal to or smaller than 6 mm, the design is generally considered difficult.

However, in the present invention, since the pillars of the roller retainer are utilized to retain the rollers from a direction radially outwardly, not only can the non-detachability of the rollers be achieved, but also the pillars do not exist on the pitch circle depicted in the circular row of the rollers. For this reason, the presence of the pillars does not result in increase of the space between the neighboring rollers and, even in the case where each roller has a diameter equal to or smaller than 6 mm, the number of the rollers used in the retainer type roller bearing assembly of the present can have the rollers in a number substantially equal to or smaller by one or two than the number of the rollers used in the full complement roller bearing.

In another preferred embodiment of the present invention, the roller retainer has an outer diameter smaller by 0.1 mm or more than a minimum diameter ($d2o$) of a circle circumscribing the circular row of the rollers. It is to be noted that the minimum diameter ($d2o$) of the circle circumscribing the circular row of the rollers means the diameter of the circumscribing circle when the rollers 2 are arranged so as to be seated on the raceway surface $1a$ of the inner race. If a gap of a size equal to or greater than 0.1 mm exists relative to an inner surface of a bearing box which the rollers contact, the roller retainer will not strongly contact, making it possible to avoid an undesirable increase of the frictional torque which would otherwise occur when the roller retainer contacts the inner surface of the bearing box.

In a further preferred embodiment of the present invention, the roller retainer has an inner diameter greater by 0.1 mm or more than the pitch diameter circle depicted in the circular row of the rollers. This is particularly advantageous in that it is possible to avoid the lack of strength, which would otherwise result from reduction in width of the innermost diametric portion of each of the pillars, without the space between the neighboring rollers being increased.

Also preferably, the roller retainer may be provided with a plurality of axial slits cut to extend from one end thereof to a position adjacent the opposite end thereof.

According to this feature, during assemblage of the roller bearing assembly, insertion can readily be accomplished by radially outwardly expanding a portion of the roller retainer on an insertion side, i.e., one of the opposite ring parts which is oriented towards the circular row of the rollers during the mounting of the roller retainer on the inner race. Thereafter, by allowing the roller retainer to restore to the original shape or diameter by the effect of elasticity possessed by the material used for the roller retainer, the rollers are nested within the respective pockets, thereby completing the assembly. The presence of the slits can allow the roller retainer to be deformed within the limit of elasticity possessed by the material for the roller retainer during the insertion of the roller retainer and, hence, the flexure deformation of the roller retainer can be minimized and the possible reduction of the precision, which would otherwise result from the deformation, can be avoided. In this way, the assemblability of the roller retainer and the precision thereof can be increased and, also, the assemblage can be automated.

Preferably, the axial slits may concurrently serve as a pocket for accommodating the corresponding roller. In other words, depleted areas are provided in the ring part of one end of the roller retainer in alignment with some of the pockets and the slits may be formed by such depleted areas and the pockets.

Positioning of the rollers within the slits is effective to allow the number of the rollers used to be increased, resulting in increase of the load bearing capacity of the roller bearing assembly even though the slits are employed.

In a still further preferred embodiment of the present invention, an end edge of an inner peripheral surface of the roller retainer is axially outwardly tapered to represent a linear sectional shape or an arcuate sectional shape. Formation of the end edge of the inner peripheral surface of the roller retainer so as to be axially outwardly tapered is effective to further facilitate insertion of the roller retainers to the outside of the circular row of the rollers during assemblage, resulting in further increase of the assemblability.

In any of the preferred features of the roller bearing assembly described above, the roller retainer may have a split area defined at a location circumferentially thereof. The provision of the split area allows the roller retainer to be radially outwardly expanded to the outside of the circular row of the roller to thereby facilitate the insertion.

Where the split area is used in the roller retainer described above, one of the roller is preferably positioned in the split area of the roller retainer. Intervention of the roller in the split area of the roller retainer allow the number of the rollers used to be increased although the split area is provided, resulting in increase of the load bearing capacity of the roller bearing assembly.

The present invention in accordance with another aspect of the present invention also provides a roller bearing assembly, which includes a plurality of rollers, a ring-shaped inner roller retainer having a plurality of inner pockets defined therein in a direction circumferentially thereof for accommodating therein the respective rollers in a circular row and also having inner pillars each defined between the neighboring inner pockets, and a ring-shaped outer roller retainer having a plurality of outer pockets defined therein in a direction circumferentially thereof for accommodating therein the respective rollers in the circular row and also having outer pillars each defined between the neighboring outer pockets. Each of the rollers is partly received within the inner pocket and partly within the outer pocket. The inner roller retainer is positioned with each of the inner pillars thereof intervening between the neighboring rollers to thereby retain the rollers in position within the respective inner pockets from radially inside of the row of the rollers, and a diameter of a circle depicted by and in touch with radially outward ends of the inner pillars is smaller than a diameter of the pitch circle depicted in the circular row of the rollers. Also, the outer roller retainer is positioned with each of the outer pillars thereof intervening between the neighboring rollers to thereby retain the rollers in position within the respective outer pockets from radially outside of the row of the rollers and a diameter of a circle depicted by and in touch with radially inward ends the outer pillars is greater than the diameter of the pitch circle depicted in the circular row of the rollers.

According to this aspect of the present invention, since the inner and outer roller retainers are employed, the roller assembly of a non-detachable type, in which the rollers will not drop off or separate from each other prior to the roller bearing assembly being incorporated in a machine or equipment can be obtained even though it is a retainer type roller bearing having no raceway. In such case, because the inner and outer pillars of the inner and outer roller retainers are used to retain the rollers from respective directions radially inwardly and outwardly of the circular row of the rollers and because the outer diameter of the inner pillars of the inner roller retainer is chosen to be smaller than the pitch circle diameter represented by the circular row of the rollers while the inner diameter of the outer pillars of the outer roller retainer is chosen to be greater than the pitch circle diameter, it is possible to allow the inner and outer pillars of the inner and outer roller retainers not to exist on the pitch circle depicted by the circular row of the rollers.

For this reason discussed above, the space between the neighboring rollers, which would increase if each pillar is positioned on the pitch circle, does not increase and the resultant roller bearing assembly, although assembled as a non-detachable type with the use of the roller retainer, can have the rollers in a number about equal to the number of the rollers employed in the full complement roller bearing. Hence, as compared with the conventional bearing assembly of a type having the inner race and having the same sectional height, a relatively large load bearing capacity can be exhibited. Because of this, the various problems hitherto encountered with the full complement roller bearing can advantageously be eliminated such as the capability of assembling with a minimized number of assembling steps with no need to use any drop-off preventive sleeve.

In a preferred embodiment of the present invention, each of the inner and outer roller retainers may be provided with a plurality of axial slits cut to extend from one end thereof to a position adjacent the opposite end thereof.

According to this feature, during assemblage it is possible to allow that portion of the outer roller retainer on the insertion side to be radially outwardly expanded and also to allow that portion of the inner roller retainer on the insertion side to be radially inwardly constricted, to thereby facilitate insertion of the rollers in between the outer and inner roller retainers.

Where the axial slits are provided in each of the inner and outer roller retainers, the axial slits in the inner roller retainer and the axial slits in the outer roller retainer may preferably be displaced relative to each other in a direction circumferentially thereof. This allows a sufficient retaining strength to be obtained through the use of the inner and outer roller retainers even though the slits are employed.

Yet, in a preferred embodiment of the present invention, the inner and outer roller retainers may be integrated together, to thereby increase the assemblability.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 5A to 5C are fragmentary front views, showing different arrangements of rollers in the respective roller retainers shown in FIGS. 4A to 4D, respectively;

FIGS. 6A to 6C are fragmentary side views, showing different joints in the roller retainers according to a fifth preferred embodiment of the present invention;

DETAILED DESCRIPTION OF THE PREFERRED EMBODIMENTS

Figure 1A:
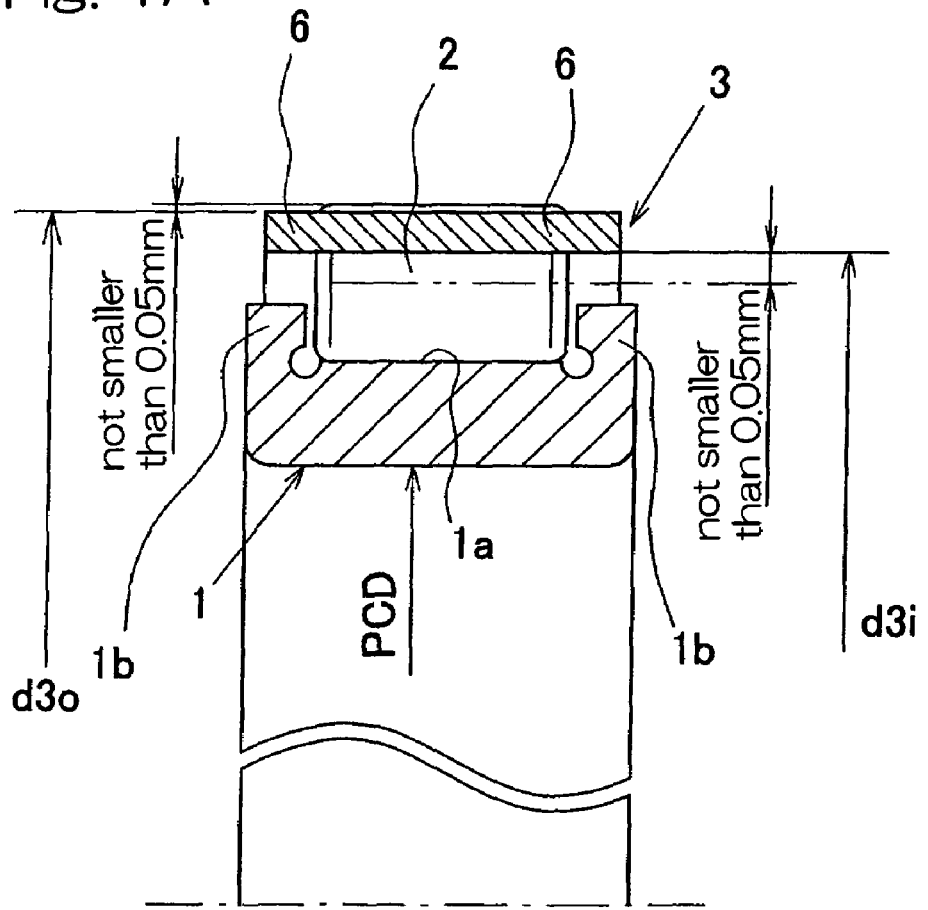
FIG. 1A is a fragmentary longitudinal sectional view of a roller bearing assembly according to a first preferred embodiment of the present invention.
Figure 1B:
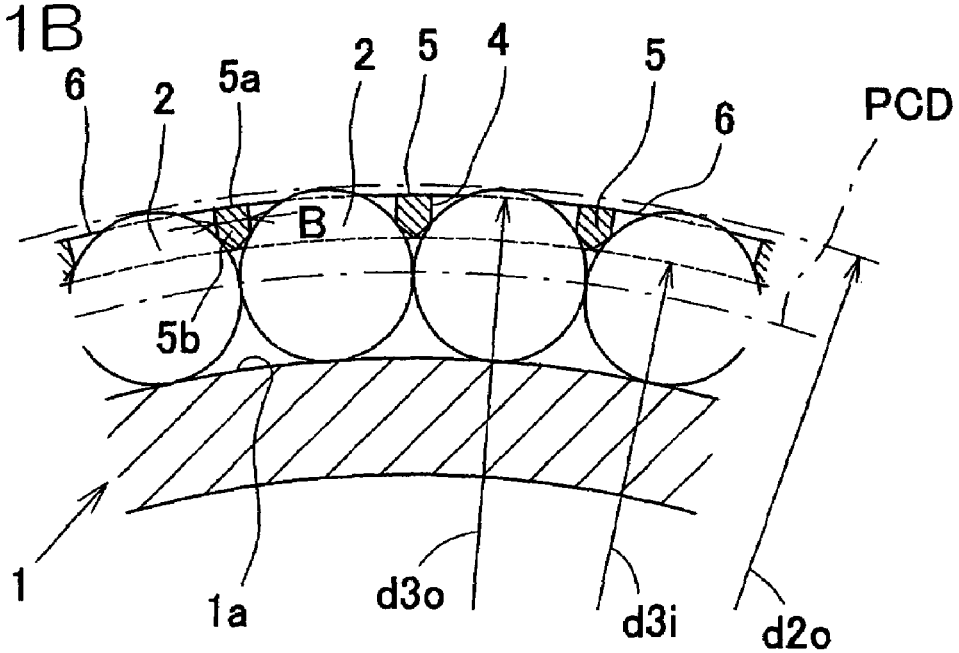
FIG. 1B is a fragmentary cross-sectional view of the roller bearing assembly shown in FIG. 1A.

Referring to FIGS. 1A and 1B, showing a first preferred embodiment of the present invention, a roller bearing assembly shown therein includes an inner race 1 having a raceway surface 1a defined by an outer peripheral surface of such inner race 1, a circular row of rollers 2 held in rolling contact with the raceway surface 1a, and a ring-shaped roller retainer 3. The roller retainer 3 is of a generally ladder-like configuration having a plurality of pockets 4 arranged in a direction circumferentially thereof. The roller retainer 3 also has pillars 5 each defined between the neighboring pockets 4 and, while the rollers 2 are accommodated within the respective pockets 4 as seated on the raceway surface 1a, the roller retainer 3 is positioned on one side of the pitch circle of the rollers 2 in the circular row opposite to the raceway surface 1a, with each retainer pillar 5 thereof intervening between the neighboring rollers 2 to thereby retain the rollers 2 in position within the pockets 4 from a direction radially outwardly of the row of the rollers 2.

The inner race 1 has its opposite ends formed integrally with radially outwardly extending collars 1b and is prepared by machining a steel material. On the other hand, the roller retainer 3 is made of an elastically deformable synthetic resin such as, for example, polyamide (for example, PA66 or PA46) or polyacetal. If the synthetic resin as a material for the roller retainer 1 is employed in the form of a non-reinforced synthetic resin or a reinforced synthetic resin containing reinforcement fibers such as, for example, carbon fibers or glass fibers, the resultant roller retainer 3 can have a flexibility and a strength appropriate for the bearing size and the bearing application.

The roller retainer 3 has its opposite axial ends each in the form of a ring part 6, with the pillars 5 extending axially between the opposite ring parts 6 and equidistantly spaced in a direction circumferentially thereof. A space between the neighboring pillars 5 defines the pocket 4 for accommodating the respective roller 2. As best shown in FIG. 1B, each of the pillars 5 of the roller retainer 3 has such a sectional shape as to have a substantially constant, maximum width, as measured in a direction circumferentially of the roller retainer 3, at an outermost diametric portion thereof and a radially inwardly decreasing width at an inner diametric portion thereof. By way of example, each retainer pillar 5 represents a generally pentagonal sectional shape with the inner diametric portion tapering radially inwardly of the circular row of the rollers 2.

The roller retainer 3 has an outer diameter d3o which is smaller by 0.1 mm or more than the minimum diameter d2o of the circle circumscribing the circular row of the rollers 2. This difference between the outer diameter d3o and the diameter d2o of the circumscribed circle is preferably of a value equal to or greater than 0.1 mm regardless of the size of the roller bearing assembly. The inner diameter d3i of the circle depicted by and in touch with the inner diametric portions of the pillars 5 is chosen to be greater than the pitch circle diameter PCD by, for example, 0.1 mm or more. The extent to which the inner diameter d3i of the circle depicted by and in touch with the inner diametric portions of the pillars 5 is greater than the pitch circle diameter PCD may be chosen to be equal to or greater than a predetermined proportion determined in consideration with the bearing size.

According to the foregoing embodiment, the pillars 5 of the roller retainer 3 retains the rollers 2 in position within the pockets 4 from a direction radially outwardly of the row of the rollers 2 and the inner diameter d3i of the circle depicted by and in touch with the inner diametric portions of the pillars 5 is chosen to be greater than the pitch circle diameter PCD. Accordingly, it is possible to allow the pillars 5 not to exist on the pitch circle represented by the pitch circle diameter PCD and, therefore, the space between the neighboring rollers 2, which would increase if each pillar 5 is positioned on the pitch circle, does not increase and the resultant roller bearing assembly can have the rollers 2 in a number equal to or smaller by one or two than the number of the rollers employed in the full complement roller bearing. Also, the strength of the pillars 5 can advantageously be secured.

As described above, the roller bearing assembly of the structure according to the foregoing embodiment of the present invention can exhibit a non-detachability of the rollers, that is, to enable the roller to be retained rotatably, but firmly in position, by the use of the roller retainer 3 and can have the rollers in a number about equal to that in the full complement roller bearing. Therefore, the various problems inherent in the full component bearing assembly can advantageously be eliminated substantially. By way of example, the following advantages can be obtained.

Even in a bearing assembly using rollers 2 each having opposite flat end faces, the rollers 2 can be rendered to be non-detachable relative to the inner race 1 and also to the roller retainer.

Since the rollers 2 each having the opposite flat end faces can be used, the effective length of each roller can be advantageously set to a maximum available value within the limited widthwise size.

No limitation is imposed on the lubricant such as observed with the roller bearing assembly filled with the thermal curable grease and any lubricant can be employed as desired.

Assemblage of the roller bearing assembly of the present invention is easier than that of the conventional non-detachable full complement roller bearing assembly.

User's handling is easier than that of the full component bearing assembly of a detachable type.

With the roller bearing assembly according to the foregoing embodiment, the following additional advantages can also be obtained. For example, since the outer diameter d3o of the roller retainer is chosen to be smaller by 0.1 mm or more than the minimum diameter d2o of the circle circumscribing the circular row of the rollers 2, a gap of 0.1 mm or more appears between a bearing box and the roller retainer 3. Because of this, the roller retainer 3 does in no way contact the bearing box strongly and, therefore, an undesirable increase of the frictional torque brought about by the roller retainer 3 can be avoided.

The inner diameter d3i of the circle depicted by and in touch with the inner diametric portions of the pillars 5 is chosen to be greater than the pitch circle diameter PCD and the extent to which the inner diameter d3i is increased relative to the pitch circle diameter PCD is chosen to be 0.1 mm or more. Accordingly, the space between the neighboring rollers 2 need not be increased and it is possible to avoid the lack of strength which would otherwise result from reduction in width of the innermost diametric portion of each of the pillars 5.

Also, since each of the pillars 5 of the roller retainer 3 has such a sectional shape as to have a substantially constant, maximum width, as measured in a direction circumferentially of the roller retainer 3, at an outermost diametric portion thereof and a radially inwardly decreasing width at an inner diametric portion thereof, each of the pillars 5 can have an increased sectional area with no need to increase the space between the neighboring rollers 2 and, also, the lubricity is excellent.

In other words, since the gap between the neighboring members of the circular row of the rollers 2 represents a generally triangular shape flaring radially outwardly of the circular row of the rollers 2, increase of the sectional area of each of the pillars 5 without the space between the neighboring rollers 2 being increased requires the respective retainer pillar 5 to have a substantially triangular sectional shape tapering in a direction radially inwardly of the circular row of the rollers 2. However, in the illustrated embodiment, the outermost diametric portion 5a of each retainer pillar 5, at which the respective retainer pillar 5 have a maximum width, is fixed at the a substantially constant value without being expanded in a direction circumferentially of the roller retainer 3, leaving a space between a surface of the respective roller 2 and a surface of the respective retainer pillar 5. This unique design is effective to eliminate an undesirable blockage of the lubricant to thereby minimize reduction of the lubricity. Also, the pillars 5 will no have any unnecessary, good-for-nothing portion and, therefore, the amount of the synthetic resin used as a material for the roller retainer 3 can advantageously be reduced.

Figure 2:
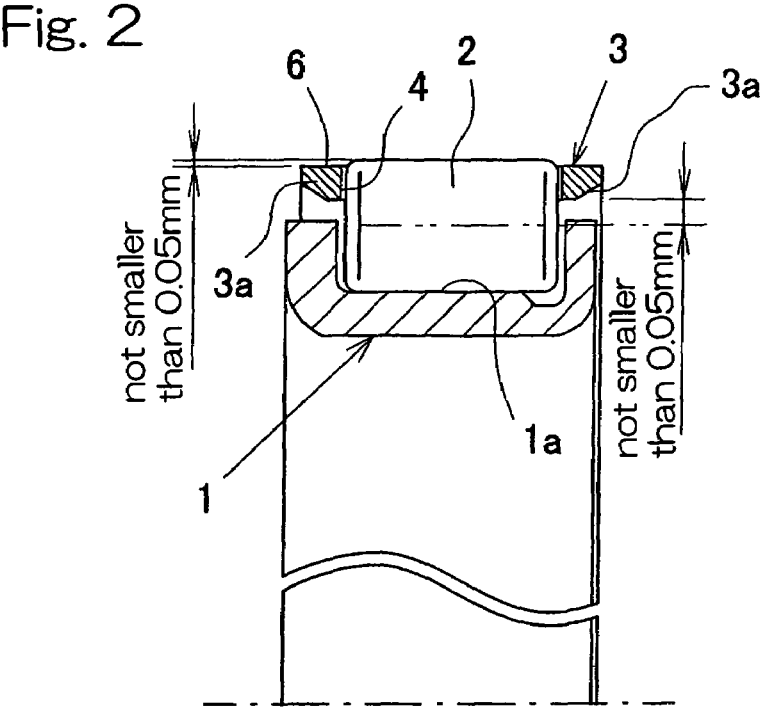
FIG. 2 is a fragmentary longitudinal sectional view of the roller bearing assembly according to a second preferred embodiment of the present invention.

FIG. 2 illustrates the roller retainer 3 according to a second preferred embodiment of the present invention. In this second embodiment, the inner race 1 is of a drawn cup type, i.e., a press-worked product made of a steel plate. In addition, the roller retainer 3 has opposite end portions 3a of the inner peripheral surface thereof so shaped as to be inclined axially outwardly and upwardly.

Other structural features of the roller retainer 1 shown in FIG. 2 than those described above are substantially similar to those shown in and described in connection with the previous embodiment with reference to FIGS. 1A and 1B and, therefore, the details thereof are not reiterated for the sake of brevity.

According to the second embodiment shown in FIG. 2, by allowing the opposite end portions 3a of the inner peripheral surface of the roller retainer 3 to incline axially outwardly and upwardly, the roller retainer 3 can conveniently smoothly be inserted into the outside of the circular row of the rollers 2 during the assemblage, resulting in increase of the assemblability. Also, since the opposite end portions 3a of the inner peripheral surface of the roller retainer 3 is inclined axially outwardly and upwardly, the roller retainer 3 can conveniently smoothly inserted into the outside of the circular row of the rollers 2 from either one of the directions, i.e., from either leftwards or rightwards as viewed in FIG. 2.

Figure 3:
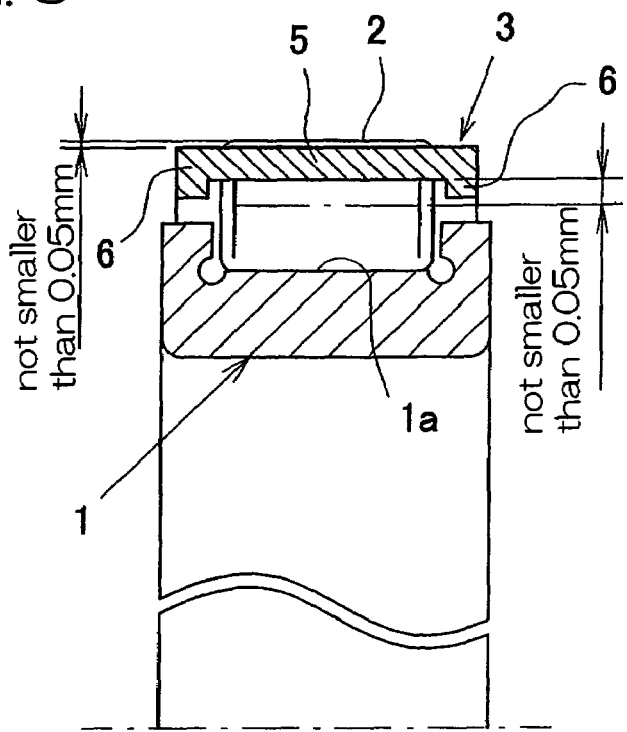
FIG. 3 is a fragmentary longitudinal sectional view of the roller bearing assembly according to a third preferred embodiment of the present invention.

FIG. 3 illustrates the roller retainer 3 according to a third preferred embodiment of the present invention. According to this third embodiment, the inner race 1 is in the form of a machined product formed by machining a steel plate, and the roller retainer 3 is so shaped as to have its axially opposite ring parts 6 each having a thickness, as measured in a direction radially of the roller retainer 3, that is greater than that of each of the pillars 5. Other structural features of the roller retainer 1 shown in FIG. 3 than those described above are substantially similar to those shown in and described in connection with the previous embodiment with reference to FIGS. 1A and 1B and, therefore, the details thereof are not reiterated for the sake of brevity.

Even with this design, functions and effects similar to those afforded by the first embodiment shown in and described with reference to FIGS. 1A and 1B can be obtained.

FIGS. 4A to 4D and FIGS. 5A to 5C illustrates a fourth preferred embodiment of the present invention. Any of various forms of the roller retainer 3 according this fourth embodiment is particularly applicable to any one of the first to third embodiments of the present invention shown in and described with reference to FIGS. 1A and 1B, FIG. 2 and FIG. 3, respectively. As shown in FIGS. 4A to 4D, the roller retainer 3 employed in the roller bearing assembly according to any one of the first to third embodiments is formed with a plurality of axial slits 7, 7A at respective locations in a direction circumferentially thereof so as to extend from one end to a position adjacent the opposite end thereof. Except for the use of the axial slits 7, 7A, the roller retainer 3 is of the structure substantially identical with that shown in and described in connection with any one of the first to third embodiments.

Figure 4A:
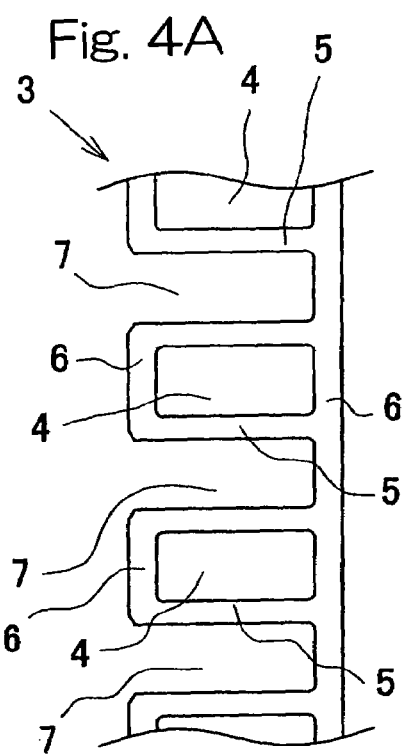
FIGS. 4A to 4D are fragmentary front views, showing various roller retainers according to a fourth preferred embodiment of the present invention, respectively.

Specifically, FIG. 4A illustrates the roller retainer 3, in which the axial slits 7 are formed therein so as to extend axially inwardly from one end (a left end as viewed in FIG. 4A) of the roller retainer 3. In contrast thereto, FIG. 4B illustrates the roller retainer 3, in which a combination of the odd-numbered axial slits 7 formed so as to extend axially inwardly from one end of the roller retainer 3 and the even-numbered axial slits 7 formed so as to extend axially inwardly from the opposite end of the same roller retainer 3 are employed with the odd-numbered axial slits 7 alternating with the even-numbered axial slits 7 in a direction circumferentially of the roller retainer 3.

Figure 4B:
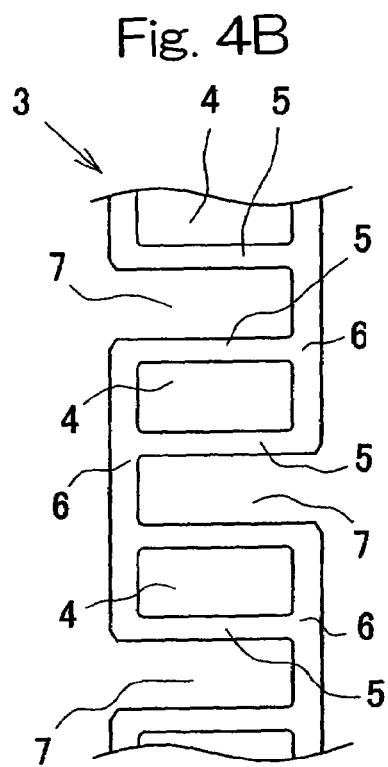
Figure 4C:
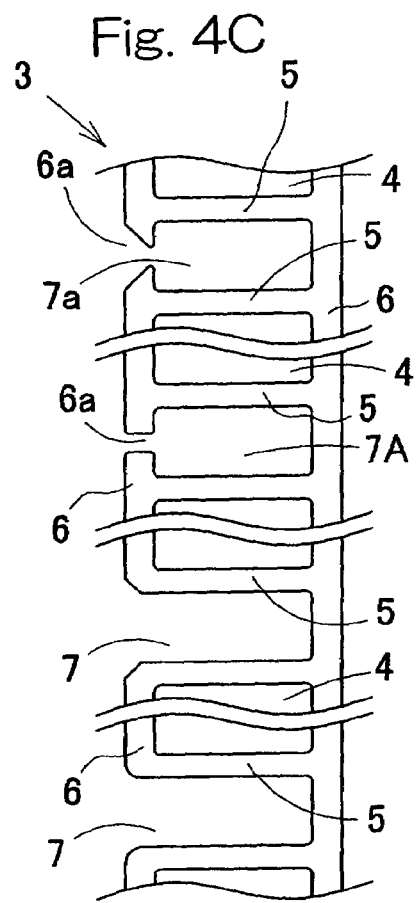

FIG. 4C illustrates the roller retainer 3, in which the axial slits 7 and 7A extend axially inwardly from one end (a left end as viewed in FIG. 4C) thereof, but in which two types of slits 7 and 7A are employed. Specifically, the axial slits 7 are comprised of a segment, in which a portion of the ring part 6 between the neighboring pillars 5 is depleted substantially completely, and a segment which concurrently serves as a pocket between the neighboring pillars 5. On the other hand, the axial slits 7A are comprised of a segment, in which a portion of the ring part 6 between the neighboring pillars 5 is depleted partially at a location 6a, and a segment which concurrently serves as a pocket between the neighboring pillars 5. The axial slits 7 and 7A are so formed in the roller retainer 3 as to alternate with each other in a direction circumferentially of the roller retainer 3.

Figure 4D:
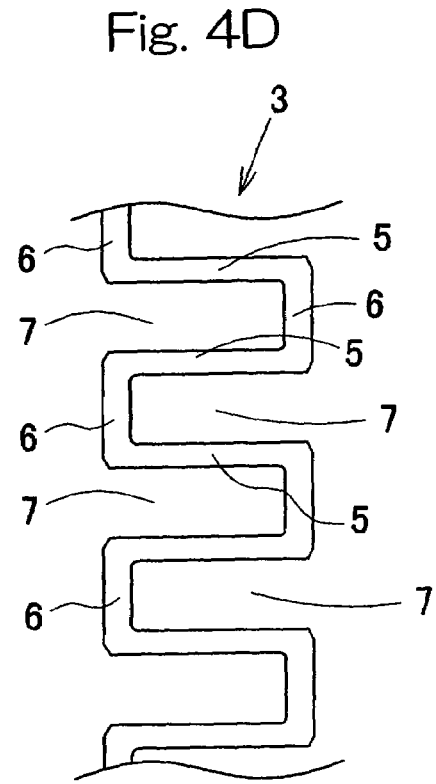

FIG. 4D illustrates the roller retainer 3, in which the axial slits 7 extending axially inwardly from one end thereof and the axial slits 7 extending axially inwardly from the opposite end thereof are employed and alternate with each other in a direction circumferentially of the roller retainer, allowing the roller retainer 3 as a whole to represent a generally staggered configuration. This roller retainer 3 shown in FIG. 4D may be considered similar to that shown in FIG. 4B, but the dedicated pockets 4 are dispensed.

In any one of the examples shown in FIGS. 4A, 4B and 4D, the slits of the roller retainer 3 includes portions of the ring part 6 each between the neighboring pillars 5 are depleted substantially completely, and the portions each concurrently serving as a pocket between the neighboring pillars 5.

In the roller retainer according to any one of the examples shown in FIGS. 4A and 4B, the pockets 4 and the axial slits 7 are so formed as to alternate with each other with each of the pillars 5 positioned between the pocket 4 and the slit 7 concurrently serving as a pocket.

In the example shown in FIG. 4C, the axial slits 7A are formed by opening or slitting an arrangement of the pockets 4 and, in addition to the pillars 5 formed between the pocket 4 and the slits 7 concurrently serving as a pocket 4, the pillars are also formed between neighboring dedicated pockets although not shown in FIG. 4C. Even in the examples shown in FIGS. 4A and 4B, respectively, the slits 7 may be formed by opening or slitting an arrangement of the pockets 4.

Each of the pillars 5, whether it is positioned between the pocket 4 and the slit 7 or whether it is positioned between the neighboring dedicated pockets 4, may be of a shape similar to that described in connection with the first embodiment with particular reference to FIG. 1B.

FIGS. 5A to 5C illustrate different manners of retaining the rollers 2 in the roller retainer 3 of the structure described above. Specifically, FIG. 5A illustrates the roller retainer 3 (according to the example shown in FIG. 4A), in which the axial slits 7 are defined only on one side thereof, with the rollers 2 accommodated within not only the pockets 4, but also the slits 7. This is particularly advantageous in that the load bearing capacity of the roller bearing assembly can be increased.

FIG. 5B illustrates the roller retainer 3 (according to the example shown in FIG. 4B), in which the axial slits 7 are defined on both sides thereof, with the rollers 2 accommodated within not only the pockets 4, but also the slits 7. FIG. 5C illustrates the roller retainer 3 (according to the example shown in FIG. 4D, in which only the slits 7 are employed, with the rollers 2 accommodated within those all slits 7.

In the roller bearing assembly employing the roller retainer 3 according to any one of the respective examples shown in FIGS. 4A to 5C, the roller retainer 3 are formed with the plural slits 7, 7A cut so as to extend from one end thereof to a position adjacent the opposite end thereof. Accordingly, during assemblage of the roller bearing assembly, insertion can readily be accomplished by radially outwardly expanding a portion of the roller retainer 3 on an insertion side, i.e., one of the opposite ring parts 6 which is oriented towards the circular row of the rollers 2 during the mounting of the roller retainer 3 on the inner race 1. For this reason, the roller retainer 3 can be deformed within the limit of elasticity possessed by the material for the roller retainer 3 and, hence, not only the assemblability but also the precision can advantageously be increased while the flexure deformation of the roller retainer 3 can be minimized and the possible reduction of the precision, which would otherwise result from the deformation, can be avoided. Also, the use of the roller retainer 3 of the particular design is effective to increase the assemblability of the roller retainer to thereby increase the precision even though the inner race 1 is in the form of a machined product as hereinbefore referred to.

FIG. 6 illustrates a fifth preferred embodiment of the present invention. While in the embodiment shown in FIGS. 4A to 5C, the roller retainer 3 has been shown and described as having the plural slits 7 (7A) deployed in a direction circumferentially thereof, the roller retainer 3 according to any one of the first to third embodiments shown and described with reference to FIGS. 1A and 1B, FIG. 2 and FIG. 3, respectively, may have a split area 8 at one location thereof in the circumferential direction thereof as shown in any one of FIGS. 6A to 6C.

According to the fifth embodiment, other structural features of the roller retainer than the use of the slit area 8 in the roller retainer 3 are substantially similar to those of the roller retainer 3 according to any one of the first to third embodiments shown and described with reference to FIGS. 1A and 1B, FIG. 2 and FIG. 3, respectively.

Figure 9A:
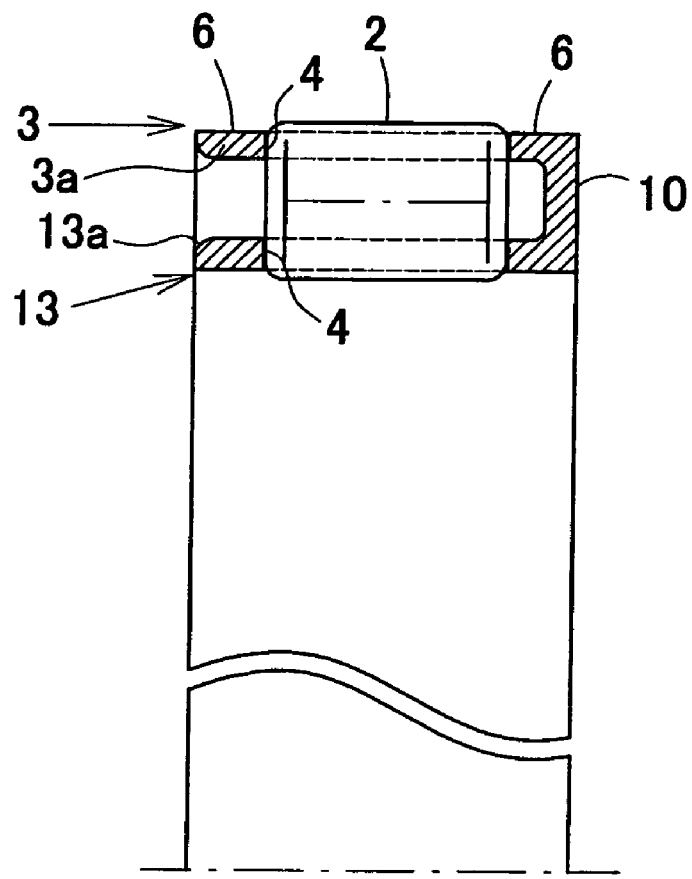
FIG. 9A is a fragmentary longitudinal sectional view of the roller bearing assembly according to an eighth preferred embodiment of the present invention.
Figure 9B:
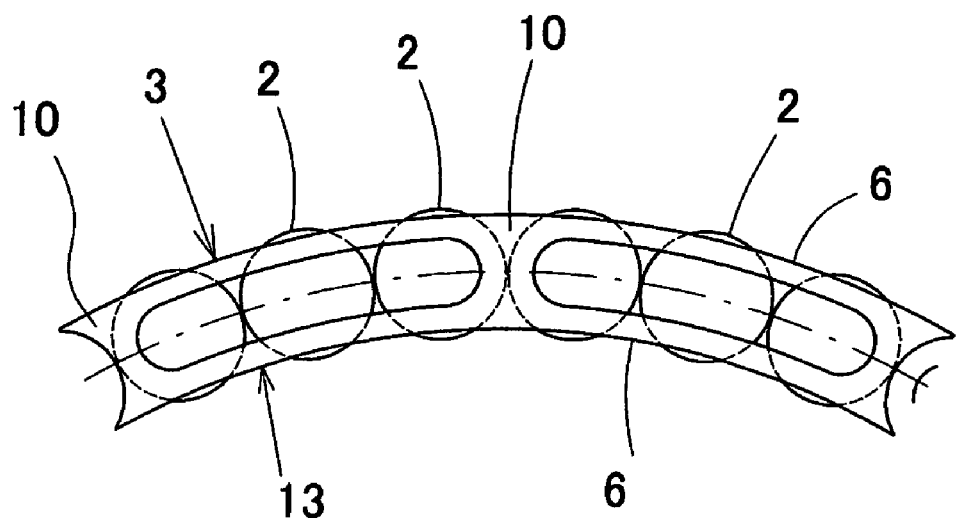
FIG. 9B is a fragmentary side view of the roller bearing assembly shown in FIG. 9A.

The split area 8 may be of a design, in which a recess 9a defined in one end of the divided ring part 6 of the roller retainer 3 can releasably receive therein a projection 9b defined in the opposite end of the divided ring part 6 as shown in, for example, FIG. 6A, or the opposite ends of the divided ring part 6 may have respective projections 9c, which form a halving joint, as shown in FIG. 9B. Alternatively, as shown in FIG. 9C, the opposite ends of the divided ring part 6 may be so shaped as to define a respective flat end face so that the opposite ends of the divided ring part 6 can be butt-jointed.

Even where the split area 8 is defined in the roller retainer 3 at one location in the circumferential direction thereof as hereinabove described, one end of the roller retainer 3 where the split area 8 is defined can be radially outwardly deformed as is the case with the roller retainer 3 having the slits 7 (7A) defined therein. For this reason, during the assemblage performed in the manner described hereinbefore, the roller retainer 3 can be inserted outside the circular row of the rollers 2 without the roller retainer 3 forcibly deformed considerably, resulting in increase of the assemblability and also increase of the precision. In a manner similar to the previously described embodiment in which the rollers 2 are arranged inside the slits 7, 7A, a roller 2 may be arranged in a pocket equivalent having one side surrounded by the ring part 6 having the split area 8 defined therein. By so arranging the rollers 2 in the manner described above, the load bearing capacity of the roller bearing can advantageously be increased.

FIG. 7 illustrates a sixth preferred embodiment of the present invention. This sixth embodiment is an example in which the present invention is applied to the roller bearing assembly having neither an inner raceway nor an outer raceway. The roller bearing assembly shown therein includes inner and outer roller retainers 13 and 3, each in the form of a ring having a plurality of pockets 4 defined therein in a direction circumferentially thereof, and a circular row of rollers 2 operatively accommodated within the respective pockets defined in each of the inner and outer roller retainers 13 and 3. The inner roller retainer 13 is positioned on a radially inner side of the pitch circle of the rollers 2, with each retainer pillar 5 thereof intervening between the neighboring rollers 2 to thereby retain the rollers 2 in position within the pockets 4 from a direction radially inwardly of the row of the rollers 2. On the other hand, the outer roller retainer 3 is similar in structure and function to that described in connection with any of the previous embodiments and is positioned on a radially outer side of the pitch circle of the rollers 2, with each retainer pillar 5 thereof intervening between the neighboring rollers 2 to thereby retain the rollers 2 in position within the pockets 4 from the direction radially outwardly of the row of the rollers 2.

Each of the inner and outer roller retainers 13 and 3 is made of an elastically deformable synthetic resin such as, for example, polyamide (for example, PA66 or PA46) or polyacetal. If the synthetic resin as a material for the roller retainer 1 is employed in the form of a non-reinforced synthetic resin or a reinforced synthetic resin containing reinforcement fibers such as, for example, carbon fibers or glass fibers, the resultant roller retainer 3 can have a flexibility and a strength appropriate for the bearing size and the bearing application.

Each of the inner and outer roller retainers 13 and 3 has its opposite axial ends each in the form of a ring part 6, with the pillars 5 extending axially between the opposite ring parts 6 and equidistantly spaced in a direction circumferentially thereof. A space between the neighboring pillars 5 in each of the inner and outer roller retainers 13 and 3 defines the pocket 4 for accommodating the respective roller 2.

Figure 7A:
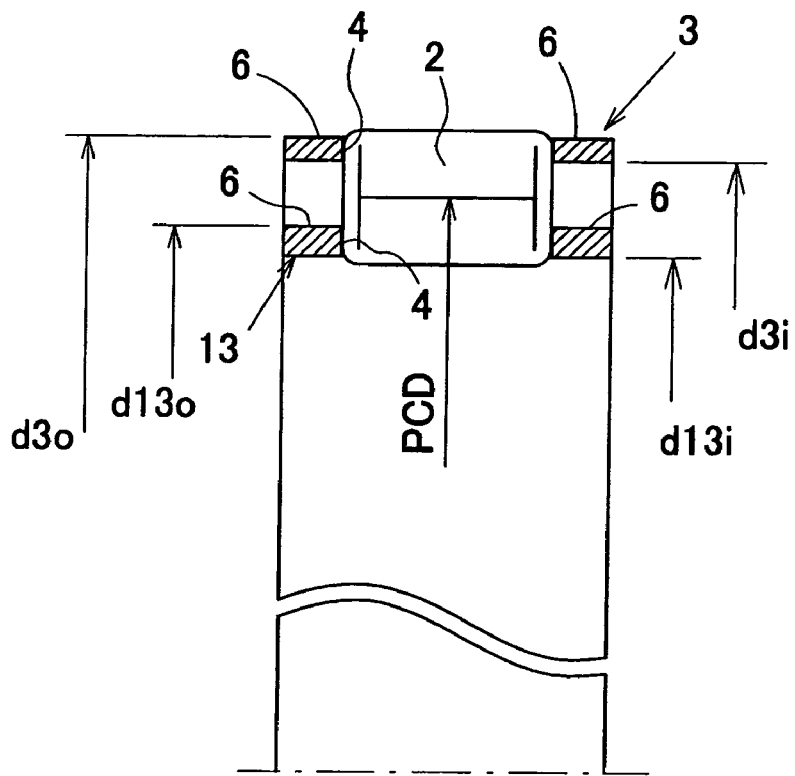
FIG. 7A is a fragmentary longitudinal sectional view of the roller bearing assembly according to a sixth preferred embodiment of the present invention.
Figure 7B:
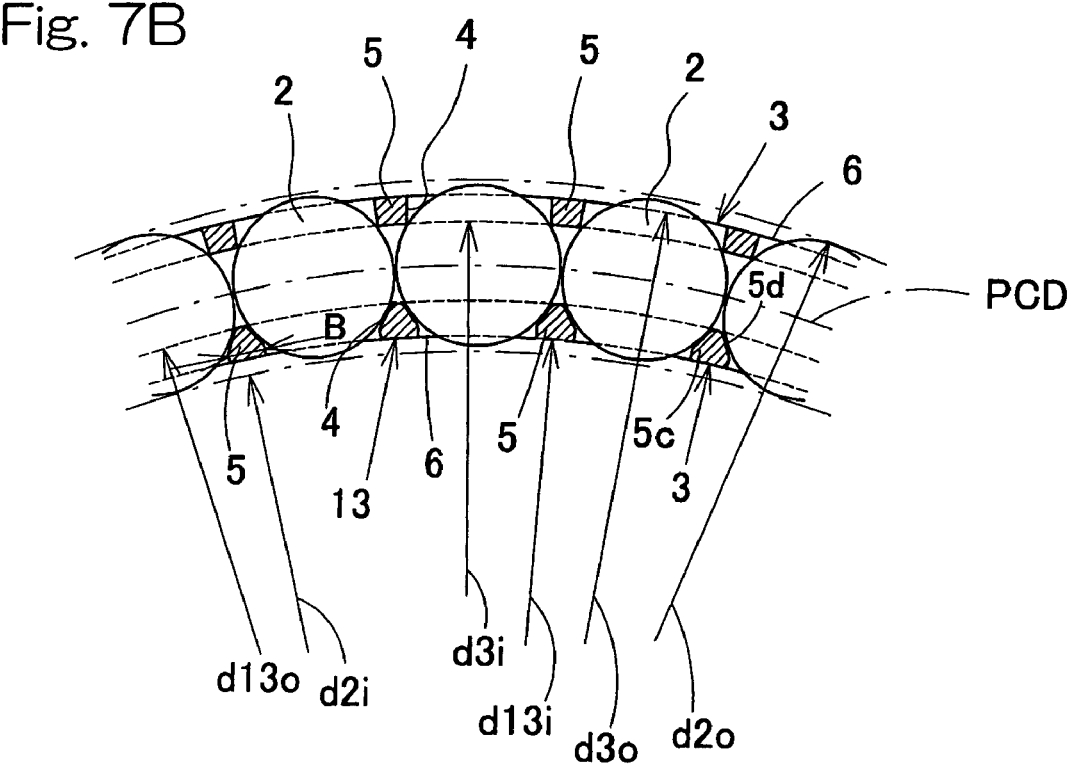
FIG. 7B is a fragmentary cross-sectional view of the roller bearing assembly shown in FIG. 7A.

As best shown in FIG. 7B, the inner roller retainer 13 has an inner diameter $d13i$ which is greater by 0.1 mm or more than the maximum diameter $d2i$ of the circle inscribing the circular row of the rollers 2. This difference between the inner diameter $d13i$ and the diameter $d2i$ of the inscribed circle is preferably of a value equal to or greater than 0.1 mm regardless of the size of the roller bearing assembly. The outer diameter $d13o$ of the circle depicted by and in touch with outermost diametric portions of the pillars 5 is chosen to be smaller than the pitch circle diameter PCD by, for example, 0.1 mm or more. The extent to which the outer diameter $d13o$ of the circle depicted by and in touch with the outermost diametric portions of the pillars 5 is smaller than the pitch circle diameter PCD may be chosen to be equal to or greater than a predetermined proportion determined in consideration with the bearing size. Each of the pillars 5 of the inner roller retainer 13 has a width B which is preferably within the range of 15 to 30% of the diameter of each roller 2.

With respect to the outer roller retainer 3, it may be substantially identical with that shown in and described in connection with the first embodiment with reference to FIGS. 1A to 1B. Specifically, the outer diameter $d3o$ of the outer roller retainer 3 is smaller by 0.1 mm or more than the minimum diameter $d2o$ of the circle circumscribing the circular row of the rollers 2. This difference between the outer diameter $d3o$ and the diameter $d2o$ of the circumscribed circle is preferably of a value equal to or greater than 0.1 mm regardless of the size of the roller bearing assembly.

The inner diameter $d3i$ of the circle depicted by and in touch with the innermost diametric portions of the pillars 5 is chosen to be greater than the pitch circle diameter PCD by, for example, 0.1 mm or more. The extent to which the inner diameter $d3i$ of the circle depicted by and in touch with the innermost diametric portions of the pillars 5 is greater than the pitch circle diameter PCD may be chosen to be equal to or greater than a predetermined proportion determined in consideration with the bearing size.

Each of the pillars 5 of the inner roller retainer 13 has such a sectional shape as to have a substantially constant, maximum width, as measured in a direction circumferentially of the inner roller retainer 13, at the innermost diametric portion $5c$ thereof and a radially outwardly decreasing width at the outer diametric portion $5d$ thereof. A top of the outer diametric portion $5d$ of each retainer pillar 5 of the inner roller retainer 13 may be angled or rounded. On the other hand, each retainer pillar 5 of the outer roller retainer 3 may have a square or pentagonal sectional shape.

According to the foregoing embodiment shown in and described with reference to FIGS. 7A and 7B, since the circular row of the rollers 2 are retained by the inner and outer roller retainers 13 and 3, a non-detachable type roller, bearing assembly being a retainer type roller bearing assembly having no raceway, can be obtained, in which the rollers 2 will not drop off or separate from each other prior to the roller bearing assembly incorporated in a machine or equipment. Considering that the respective pillars 5 of the inner and outer roller retainers 13 and 3, while intervening between the neighboring rollers 2, cooperate with each other to retain the rollers 2 in position within the pockets 4 in the inner and outer races 13 and 3 from directions radially inwardly and outwardly of the row of the rollers 2, respectively, and that the outer diameter $d13o$ of the circle depicted by and in touch with the outermost diametric portions $5d$ of the pillars 5 of the inner retainers 13 is chosen to be smaller than the pitch circle diameter PCD and the inner diameter $d3i$ of the circle depicted by and in touch with the innermost diametric portions of the pillars 5 of the outer roller retainers 3 is chosen to be greater than the pitch circle diameter PCD, the respective pillars 5 of the inner and outer roller retainers 13 and 3 do in no way exist on the pitch circle having the diameter PCD.

For the above reason, the space between the neighboring rollers 2, which would increase if each pillar 5 is positioned on the pitch circle, does not increase and the resultant roller bearing assembly can have the rollers 2 in a number about equal to the number of the rollers employed in the full complement roller bearing, even though the roller bearing assembly is of a non-detachable type utilizing the inner and outer roller retainers 13 and 3. Also, as compared with the conventional roller bearing assembly, having the inner race, of the same sectional height, a relatively large load bearing capacity can be exhibited. Accordingly, the various problems hitherto encountered with the full complement roller bearing can advantageously be eliminated substantially and, for example, the roller bearing assembly embodying the present invention as shown in FIGS. 7A and 7B can be assembled with a minimized number of assembling steps and with no drop-off preventing sleeve being employed.

For substantially eliminating the various problems hitherto encountered with the full complement roller bearing, the following various advantages can be obtained as is the case with any one of the previously described embodiments:

Even in a bearing assembly using rollers 2 each having opposite flat end faces, the rollers 2 can be rendered to be non-detachable relative to the roller retainer.

Since the rollers 2 each having the opposite flat end faces can be used, the effective length of each roller can be advantageously set to a maximum available value within the limited widthwise size.

No limitation is imposed on the lubricant such as observed with the roller bearing assembly filled with the thermal curable grease and any lubricant can be employed as desired.

Assemblage of the roller bearing assembly of the present invention is easier than that of the conventional non-detachable full complement roller bearing assembly.

User's handling is easier than that of the full component bearing assembly of a detachable type.

With the roller bearing assembly according to the foregoing embodiment shown in and described with particular reference to FIGS. 7A and 7B, the following additional advantages can also be obtained. For example, since the outer diameter d3o of the outer roller retainer 3 is chosen to be smaller by 0.1 mm or more than the minimum diameter d2o of the circle circumscribing the circular row of the rollers 2, a gap of 0.1 mm or more appears between a bearing box and the outer roller retainer 3. Because of this, the roller retainer 3 does in no way contact the bearing box strongly and, therefore, an undesirable increase of the frictional torque brought about by the outer roller retainer 3 can be avoided.

The inner diameter d13i of the circle depicted by and in touch with the innermost diametric portions 5c of the inner roller retainer 13 is chosen to be greater by 0.1 mm or more than the maximum value of the diameter d2i of the circle inscribing the circular row of the rollers 2, a gap of 0.1 mm or more appears between a shaft and the inner roller retainer 13. Because of this, the inner roller retainer 13 does in no way contact the shaft strongly and, therefore, an undesirable increase of the frictional torque brought about by the inner roller retainer 13 can be avoided.

Also, since the inner diameter d3i of the circle depicted by and in touch with the innermost diametric portions of the pillars 5 of the outer roller retainer 3 is chosen to be greater than the pitch circle diameter PCD and the extent to which the inner diameter d3i is increased relative to the pitch circle diameter PCD is chosen to be 0.1 mm or more, the space between the neighboring rollers 2 need not be increased and it is possible to avoid the lack of strength which would otherwise result from reduction in width of the innermost diametric portion of each of the pillars 5.

Moreover, since the outer diameter d13o of the circle depicted by and in touch with outermost diametric portions of the pillars 5 of the inner roller retainer 13 is chosen to be smaller than the pitch circle diameter PCD and the extent to which the outer diameter d13o of the circle depicted by and in touch with the outermost diametric portions of the pillars 5 is smaller than the pitch circle diameter PCD is chosen to be equal to or greater than 0.1 mm, the space between the neighboring rollers 2 need not be increased and it is possible to avoid the lack of strength which would otherwise result from reduction in width of the outermost diametric portion of each of the pillars 5.

In addition, since each of the pillars 5 of the inner roller retainer 13 has such a sectional shape as to have a substantially constant, maximum width, as measured in a direction circumferentially of the inner roller retainer 3, at the innermost diametric portion 5c thereof and the radially outwardly decreasing width at the outer diametric portion 5d thereof positioned radially outwardly of the innermost diametric portion 5c, each of the pillars 5 can have an increased sectional area with no need to increase the space between the neighboring rollers 2 and, also, the lubricity is excellent. In other words, since the gap between the neighboring members of the circular row of the rollers 2 represents a generally triangular shape flaring radially inwardly of the circular row of the rollers 2, increase of the sectional area of each of the pillars 5 without the space between the neighboring rollers 2 being increased requires the respective retainer pillar 5 to have a substantially triangular sectional shape tapering in a direction radially outwardly. However, in the illustrated embodiment, the innermost diametric portion 5c of each retainer pillar 5, at which the respective retainer pillar 5 have a maximum width, is fixed at the a substantially constant value without being expanded in a direction circumferentially of the roller retainer 3, leaving a space between a surface of the respective roller 2 and a surface of the respective retainer pillar 5. This unique design is effective to eliminate an undesirable blockage of the lubricant to thereby minimize reduction of the lubricity. Also, the pillars 5 will no have any unnecessary, good-for-nothing portion and, therefore, the amount of the synthetic resin used as a material for the roller retainer 3 can advantageously be reduced.

Figure 8A:
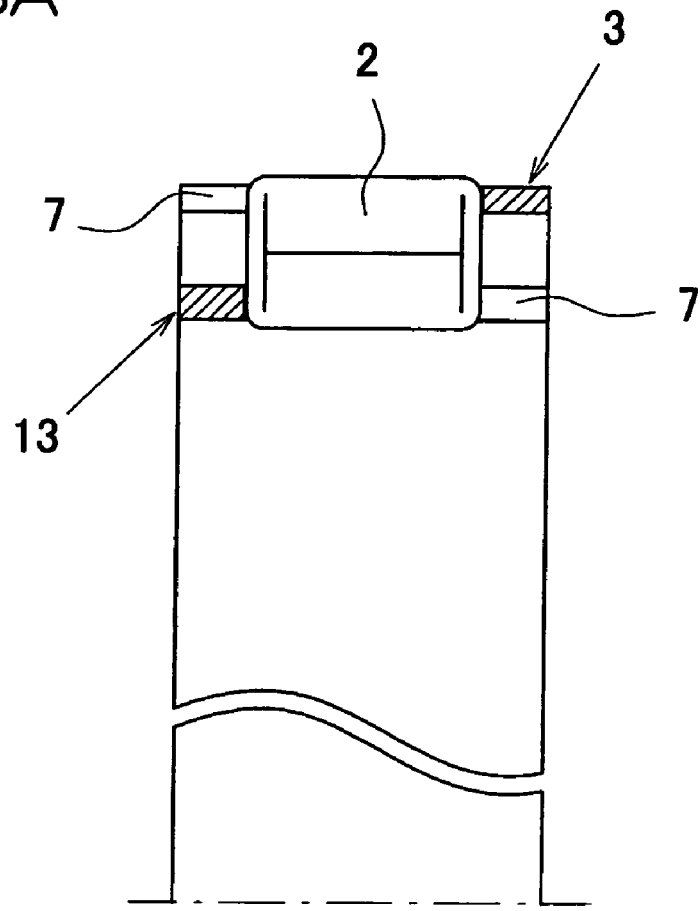
FIG. 8A is a fragmentary longitudinal sectional view of the roller bearing assembly according to a seventh preferred embodiment of the present invention.
Figure 8B:
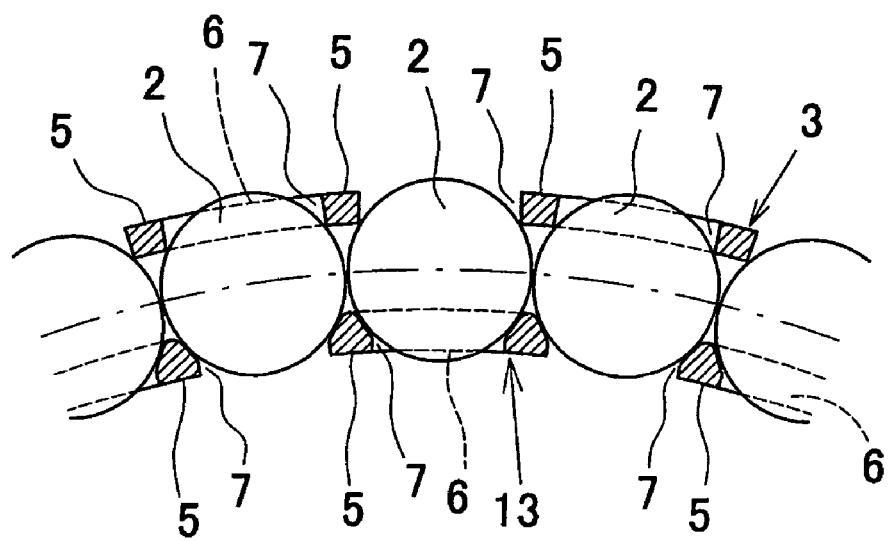
FIG. 8B is a fragmentary cross-sectional view of the roller bearing assembly shown in FIG. 8A.

FIGS. 8A and 8B illustrate a seventh preferred embodiment of the present invention. The roller bearing assembly according to this seventh embodiment is substantially similar to that according to the sixth embodiment shown in and described with reference to FIGS. 7A and 7B, except that in the embodiment of FIGS. 8A and 8B each of the inner and outer roller retainers 13 and 3 is of a structure, in which axial slits 7 are formed so as to extend from one end to a position adjacent the opposite end thereof in a manner substantially as shown in FIG. 4D. In this embodiment, the inner and outer roller retainers 13 and 3 are so positioned relative to the circular row of the rollers 2 that the axial slits 7 in one of the inner and outer roller retainers 13 and 3 are displaced in phase relative to the axial slits in the other of the inner and outer roller retainers 13 and 3 in a direction circumferentially of the circular row of the rollers 2. It is to be noted that the structure of the slits 7 in each of the inner and outer roller retainers 13 and 3 may not be always limited to such as shown in FIG. 4D, but may be such as shown in any one of FIGS. 4A to 4C.

Other structural features of the roller bearing assembly according to the seventh embodiment than those described above are substantially similar to those shown in and described with reference to FIGS. 7A and 7B and, accordingly, the details thereof are not reiterated for the sake of brevity.

According to the seventh embodiment, the use of the axial slits 7 in each of the inner and outer roller retainers 13 and 3 is effective to allow that portion of the outer roller retainer 3 on the insertion side, i.e., one of the opposite ring parts 6 which is oriented towards the circular row of the rollers 2, to be radially outwardly expanded and, also, to allow that portion of the inner roller retainer 13 similarly on the insertion side to be radially inwardly constricted, to facilitate retention of the rollers 2 by the respective outer and inner roller retainers 13 and 3.

Also, since the inner and outer roller retainers 13 and 3 are so positioned relative to the circular row of the rollers 2 that the axial slits 7 in the inner roller retainer 13 are displaced in phase relative to the axial slits 7 in the outer roller retainer 3 in a direction circumferentially of the circular row of the rollers 2 as hereinbefore described, a sufficient retaining strength, with which the rollers 2 can be retained by the inner and outer roller retainers 13 and 3, can be secured effectively.

FIGS. 9A and 9B illustrate an eighth preferred embodiment of the present invention. The roller bearing assembly shown in FIG. 9 is substantially similar to that shown in and described with reference to FIGS. 7A and 7B, except that in this embodiment of FIGS. 9A and 9B the inner and outer roller retainers 13 and 3 are partially integrated together by means of a plurality of circumferentially spaced connecting segments 10 each extending from one end of the outer roller retainer 3 to the adjacent end of the inner roller retainer 13. The number of the connecting segments 10 employed may be one for three rollers 2 as best shown in FIG. 9B. Each of the connecting segments 10 is so shaped as to allow a region, bound between the respective ring parts 6 of the inner and outer roller retainers 13 and 3 and between the neighboring connecting segments 10, to represent a generally elliptic widow 11.

Respective opposite ends of the outer and inner roller retainers 13 and 3 remote from the connecting segments 10 are left unconnected and are axially outwardly tapered as at 13a and 3a, respectively. In other words, an end edge 3a of an inner peripheral surface of the outer roller retainer 3 remote from the connecting segments 10 and an end edge 13a of an outer peripheral surface of the inner roller retainer 13 remote from the connecting segments 10 and adjacent the outer end edge 3a are axially outwardly tapered.

Connection of the inner and outer roller retainers 13 and 3 by means of the circumferentially spaced connecting segments 10 is effective to facilitate a job of inserting the inner and outer roller retainers 13 and 3 radially inwardly and outwardly of the circular row of the rollers 2 during the assemblage. Also, since the respective end edges 13a and 3a of the inner and outer roller retainers 13 and 3 remote from the connecting segments 10 are axially tapered, the insertion of the inner and outer roller retainers 13 and 3 towards the circular row of the rollers 2 with the tapered end edges 13a and 3a oriented towards the circular row of the rollers 2 can readily and smoothly be accomplished.

Figure 10A:
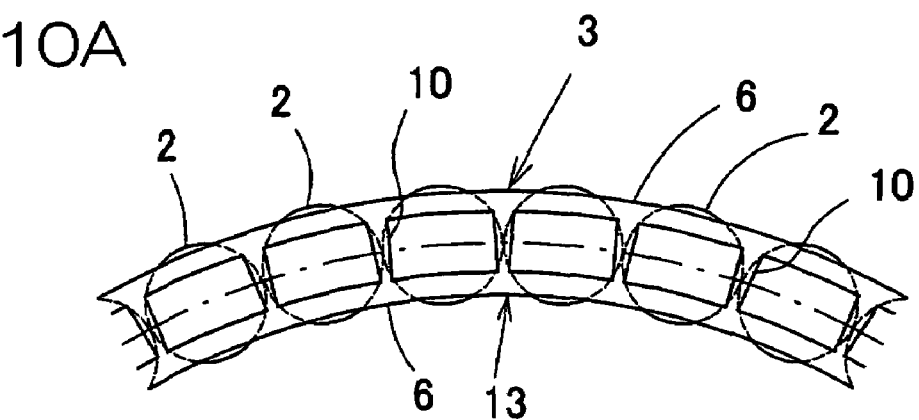
FIG. 10A is a fragmentary side view of the roller bearing assembly according to a ninth preferred embodiment of the present invention.
Figure 10B:
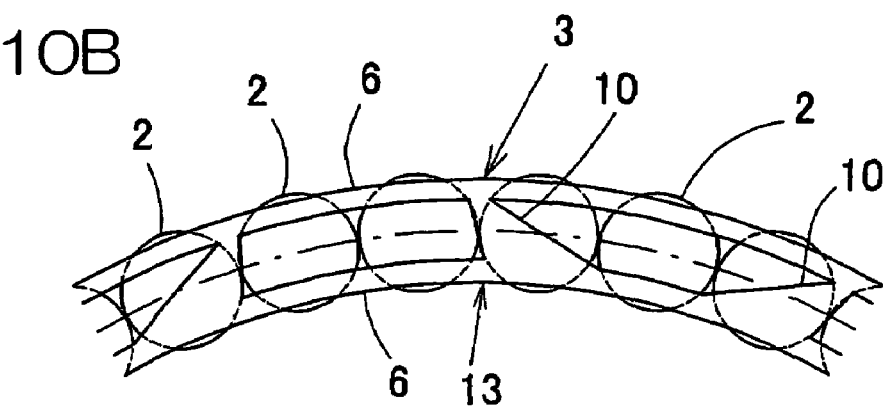
FIG. 10B is a fragmentary side view of the roller bearing assembly according to a further preferred embodiment of the present invention.
Figure 11:
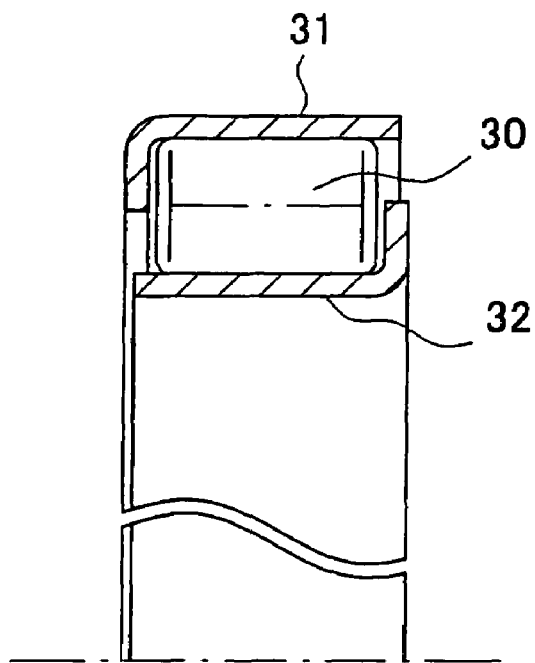
FIG. 11 is a fragmentary longitudinal sectional view of the conventional full complement roller bearing.
Figure 12A:
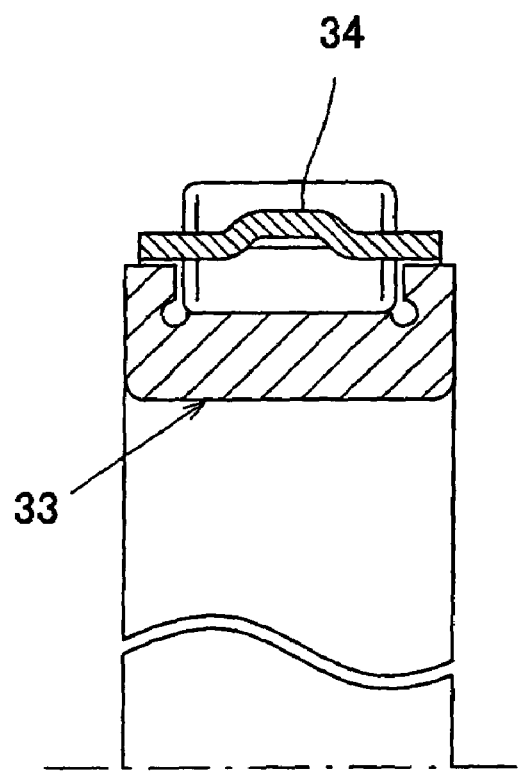
FIG. 12A is a fragmentary longitudinal sectional view of the conventional retainer type roller bearing.
Figure 12B:
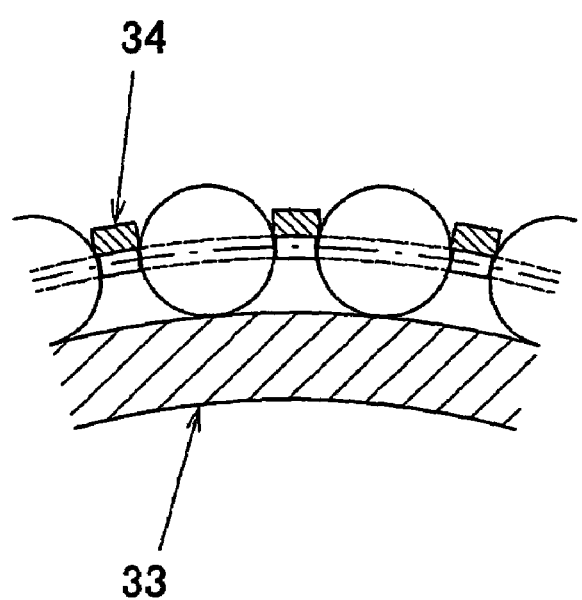
FIG. 12B is a fragmentary cross-sectional view of the conventional retainer type roller bearing shown in FIG. 12A.

FIGS. 10A and 10B illustrate a ninth preferred embodiment of the present invention. The roller bearing assembly best shown in FIG. 10A is substantially similar to that shown in and described with reference to FIGS. 9A and 9B, except for in this embodiment of FIGS. 10A and 10B, the connecting segment 10 is employed for each of the rollers 2 in the circular row and is so shaped as to allow a region, bound between the respective ring parts 6 of the inner and outer roller retainers 13 and 3 and between the neighboring connecting segments 10, to represent a generally rectangular widow 11.

Also, the roller bearing assembly best shown in FIG. 10B is substantially similar to that shown in and described with reference to FIGS. 9A and 9B, except for in this embodiment of FIGS. 10A and 10B, the connecting segment 10 is employed for two of the rollers 2 and is so shaped as to represent an outwardly flared fan shape from the ring part 6 of the inner roller retainer 13 towards the ring part 6 of the outer roller retainer 3. The connecting segment 10 may be so shaped as to represent an outwardly tapered fan shape from the ring part 6 of the inner roller retainer 13 towards the ring part 6 of the outer roller retainer 3.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A roller bearing assembly which comprises:
an inner race having a raceway surface defined therein;
a plurality of rollers; and
a ring-shaped roller retainer having a plurality of pockets defined therein in a direction circumferentially thereof for accommodating therein the respective rollers in a circular row while allowing the rollers to be seated on the raceway surface of the inner race, the roller retainer also having pillars each defined between the neighboring pockets, the roller retainer being positioned on the inner race with each of the pillars thereof intervening between the neighboring rollers to thereby retain the rollers in position within the respective pockets from a direction radially outwardly of the row of the rollers,
wherein a diameter of a circle depicted by and in touch with radially inward ends of the pillars is greater than a diameter of the pitch circle depicted in the circular row of the rollers, and
wherein the roller retainer is provided with a plurality of axial slits cut to extend from one end thereof to a position adjacent the opposite end thereof.

2. The roller bearing assembly as claimed in claim 1, wherein each of the pillars has an outer diametric portion and an inner diametric portion positioned radially inwardly of the outer diametric portion, the inner diametric portion being tapered radially inwardly in its cross-sectional shape.

3. The roller bearing assembly as claimed in claim 1, wherein the roller retainer is made of a synthetic resin.

4. The roller bearing assembly as claimed in claim 1, wherein each of the rollers has a diameter equal to or smaller than 6 mm and the number of the rollers is equal to or smaller by two or less than that of the rollers used in a full component bearing assembly.

5. The roller bearing assembly as claimed in claim 1, wherein the roller retainer has an outer diameter smaller by 0.1 mm or more than a minimum diameter of a circle circumscribing the circular row of the rollers.

6. The roller bearing assembly as claimed in claim 1, wherein the roller retainer has an inner diameter greater by 0.1 mm or more than the pitch diameter circle depicted in the circular row of the rollers.

7. The roller bearing assembly as claimed in claim 1, wherein the axial slits concurrently serve as a pocket for accommodating the corresponding roller.

8. The roller bearing assembly as claimed in claim 1, wherein an end edge of an inner peripheral surface of the roller retainer is axially outwardly tapered to represent a linear sectional shape or an arcuate sectional shape.

9. The roller bearing assembly as claimed in claim 1, wherein the roller retainer has a split area defined at a location circumferentially thereof.

10. The roller bearing assembly as claimed in claim 9, wherein one of the roller is positioned in the split area of the roller retainer.

11. A roller bearing assembly which comprises:
a plurality of rollers;
a ring-shaped inner roller retainer having a plurality of inner pockets defined therein in a direction circumferentially thereof for accommodating therein the respective rollers in a circular row, the inner roller retainer also having inner pillars each defined between the neighboring inner pockets; and a ring-shaped outer roller retainer having a plurality of outer pockets defined therein in a direction circumferentially thereof for accommodating therein the respective rollers in the circular row, the outer roller retainer also having outer pillars each defined between the neighboring outer pockets, wherein each of the rollers is partly received within the inner pocket and partly within the outer pocket, wherein the inner roller retainer is positioned with each of the inner pillars thereof intervening between the neighboring rollers to thereby retain the rollers in position within the respective inner pockets from radially inside of the row of the rollers, and a diameter of a circle depicted by and in touch with radially outward ends of the inner pillars is smaller than a diameter of the pitch circle depicted in the circular row of the rollers, and wherein the outer roller retainer is positioned with each of the outer pillars thereof intervening between the neighboring rollers to thereby retain the rollers in position within the respective outer pockets from radially outside of the row of the rollers, and a diameter of a circle depicted by and in touch with radially inward ends of the outer pillars is greater than the diameter of the pitch circle depicted in the circular row of the rollers, and wherein each of the inner and outer roller retainers is provided with a plurality of axial slits cut to extend from one end thereof to a position adjacent the opposite end thereof.

12. The roller bearing assembly as claimed in claim 11, wherein the axial slits in the inner roller retainer and the axial slits in the outer roller retainer are displaced relative to each other in a direction circumferentially thereof.

13. The roller bearing assembly as claimed in claim 11, wherein the inner and outer roller retainers are integrated together.

* * * * *

UNITED STATES PATENT AND TRADEMARK OFFICE
CERTIFICATE OF CORRECTION

| | |
|---|---|
| PATENT NO. | : 7,220,060 B2 |
| APPLICATION NO. | : 11/072436 |
| DATED | : May 22, 2007 |
| INVENTOR(S) | : Shingo Kono et al. |

It is certified that error appears in the above-identified patent and that said Letters Patent is hereby corrected as shown below:

Column 19, Line 16, after "rollers," delete "and".

Signed and Sealed this

Eighth Day of April, 2008

JON W. DUDAS
*Director of the United States Patent and Trademark Office*